United States Patent Office 3,597,497
Patented Aug. 3, 1971

3,597,497
POLYETHYLENE OXIDE AS AN ANTIFOAMING AGENT FOR POLYAMIDES, POLYESTERS, POLYESTERAMIDES, POLYCARBONATES AND POLYUREAS
Koji Ohno, Kurashiki, and Koichi Kawamura, Tamashima, Japan, assignors to Kurashiki Rayon Co., Ltd., Kurashiki, Japan
No Drawing. Filed Sept. 2, 1966, Ser. No. 576,855
Claims priority, application Japan, Sept. 7, 1965, 40/54,801
Int. Cl. C08g 41/04, 49/04
U.S. Cl. 260—857                              3 Claims

ABSTRACT OF THE DISCLOSURE

A method of producing viscous high molecular weight materials through a heating reaction associated with the removal of volatile materials, the process being characterized in that the heating reaction is effected under the coexistence of an organic polyether material having a molecular weight not less than 10,000. Such organic materials are present in an amount of from 0.01 to 100,000 p.p.m., said organic material being one which, when added in an amount of more than two percent by weight based on the viscous high molecular weight material being produced, can cause a phase separation.

---

The heating reaction conducted in the above manner provides an improvement associated with an elimination of the foaming tendency present when producing viscous high molecular weight materials in a heating reaction.

This invention relates to a method of preventing foaming of melted polymer in a reaction mixture and facilitating progress of the reaction in the course of manufacture of viscous high molecular weight materials.

Generally in the manufacture of viscous high molecular weight materials by heating a reaction mixture while removing volatile materials from the reaction system, foaming develops so violently that frequent interruption of the reaction may become necessary.

"Viscous high molecular weight materials" as referred to in this invention mean that high molecular weight materials produced from said reaction display viscous liquid state under the reaction conditions in the reaction system, and do not mean that the high molecular weight materials taken out from the reaction system after completion of the reaction per se are viscous materials.

We did extensive studies on the possibility of completely and continuously precluding such foaming of melt polymer in the course of the reaction.

As a result, we found that, in the manufacture of viscous high molecular weight materials by heating a reaction mixture while removing volatile materials generated from the reaction mixture, unfavourable violent foaming which occurs during the reaction can be completely prevented and the reaction can be carried out rapidly and smoothly by proceeding the reaction under the coexistence of a very small amount of an organic high molecular weight material selected from the group consisting of vinyl or polyether type high molecular weight materials having the molecular weight of not less than 10,000 in an amount within the range of from 0.01 p.p.m. to 100,000 p.p.m. based on the high molecular weight material being produced, which will cause a distinct phase separation, if said vinyl or polyester type high molecular weight material is added to the reaction mixture in an amount of more than two percent by weight based on the weight of the high molecular weight material being produced.

The term "phase separation" as used herein means that when vinyl or polyether type high molecular weight material to be made to coexist in the reaction system in this invention is made to coexist under the reaction conditions in the reaction system, clouding at least visible by the naked eyes is brought about.

The present invention will be described hereinbelow with reference to a specific example of manufacturing a highly polymerized linear polyester composed essentially of a dicarboxylic acid or a lower aliphatic diester thereof and a polymethylene glycol containing from 2 to 10 carbon atoms.

In the manufacture of such highly polymerized polyester, the reaction mixture is subjected to polycondensation reaction with stirring under a reduced pressure, and with the progress of the reaction it sometimes occurs that the polymer melt foams so violently that the further progress of the reaction is disturbed. Such a phenomenon, although observed in the course of manufacture of ordinary linear polyesters, takes place more often in the process in which various compounds are added as modifiers to the reactants. Above all, in the manufacture of a polyester modified with the addition of a polyalkylene oxide compounds the polymer melt foams so vigorously during polycondensation reaction that a sufficient degree of pressure reduction for a rapid progress of the reaction is not attained. Therefore, the reaction proceeds at a slow rate and calls for heating for a prolonged period of time to give a polymer of a desired viscosity.

The prolonged heating of the polymer brings the possibility of the end product of linear polyester being yellowing undesirably. Moreover, it offers a serious obstacle to the stable manufacture of a linear polyester having a uniform quality.

We studied from various angles about the foaming occurred in the polycondensation reaction for manufacturing polyesters, particularly highly polymerized linear polyesters from dicarboxylic acid or an ester thereof and a polymethylene glycol containing from 2 to 10 carbon atoms in the molecule, under coexistence of a compound of said polyalkylene oxide compounds if necessary in the presence of a small amount of a polyhydric carboxylic acid or polyhydric alcohol, and found that the undesirable foaming during the polycondensation reaction can be minimized and the reaction can be rapidly carried out if the polycondensation reaction is effected with the addition of a very small amount of a polyvinyl compound such as polyvinyl alkyl ether, especially polyvinyl methyl ether, or a polyether compound such as polyalkylene oxide, especially having a molecular weight of more than 10,000, or a derivative thereof.

Further, we found that generally the violent foaming during the manufacture of a viscous high molecular weight material can be prevented and the reaction is effected rapidly in stabilized manner by the addition of a very small amount of a high molecular weight material to the reaction system while a heating reaction is effected with removal of volatile materials from the reaction system.

It is known that in general high molecular weight materials of dissimilar types which may be compatible with each other under certain conditions may lose the compatibility with the changes of the environmental conditions and are separated into two different phases or are precipitated. This can occur for example by the change of the working temperature, or addition or removal of a solvent or other additive.

Such phase separation takes place in the form of separation into two clearly distinguishable phases or as separate precipitates when the dissimilar high molecular materials are present both in large amounts. If either one is in a small amount as compared with the other, the mixed solution will be clouded. If the amount of either one compound is even smaller, the cloudiness may become undiscernible with the naked eyes, and therefore it is desirable that the appearance be confirmed in the presence of predetermined amounts of the constituents.

For example, addition of different amounts of polyethylene oxide having molecular weight of from 350,000 to 500,000 in the stage of polycondensation reaction of polyethylene terephthalate which is synthesized from dimethyl terephthalate and ethylene glycol gave results as shown below:

TABLE I

| Polyethylene oxide (p.p.m./polymer): | Clouding |
|---|---|
| 0 | None. |
| 33 | Do. |
| 100 | Some. |
| 1300 | Noticable. |

As will be seen from Table I, phase separation can hardly be detected if the amount of the additive is too small and therefore more than a certain amount must be added in order to observe the phenomenon. Usually the amount is preferably more than two percent of the weight of the high polymer to be produced.

Also, phase separation of high molecular weight substances can be detected with a smaller amount of the additive if the latter has a higher molecular weight.

For example, various polyalkylene oxides were added in the stage of polycondensation reaction of the above-mentioned polyethylene terephthalate to determine the amounts of the additives required to cause the phase separation. The results are given in the following Table II:

TABLE II

| Polyalkylene oxide | Molecular weight | Amount enough to cause clouding (p.p.m./polymer) |
|---|---|---|
| Polyethylene oxide | 13,000 | 4,000 |
| Do | 100,000 | 190 |
| Do | 1,000,000 | 30 |
| Do | 1,300,000 | <30 |

Thus, although it depends on the type of material to be added, usually, the additives having greater molecular weights can be used in smaller amounts to render clear phase separation.

Accordingly, vinyl type or polyether type high molecular weight material causing phase separation made to coexist in the reaction system of this invention is directed to such material as will cause clouding at least visible by the naked eyes when added to the reaction system under the reaction conditions in an amount of at or above 2% based on the weight of the objective high molecular weight materials produced by the reaction.

The materials to be used in the present invention which are capable of inducing phase separation must not be such that may invite thermal decomposition or depolymerization of the mixture or cause excessive coloring of the final reaction product, though the phenomenon depends on the type of the reaction mixture used. This is important because, even if the foaming could be inhibited during the reaction, it does not serve the intended purpose if the final reaction product cannot be used for practical use.

The materials which can give viscous high molecular weight materials by a reaction under heating and removing volatile materials include polyesters, polyamides, polyesteramides, polycarbonates, and polyurea resins. It is thus essential for the present invention that the organic high molecular weight materials to be added should be stable in the process of manufacture of these polymers and should not invite any harmful chemical change.

Suitable for such purposes are polymers of vinyl compounds or polyether compounds. It has been found that, in many cases, the higher is the molecular weight, the less the amount of additive enough to achieve an appreciable effect may be.

The materials to be added in accordance with the present invention include vinyl and polyether high molecular weight materials, for example vinyl ether, acrylic acid, ester acrylate, styrene, vinyl ester, vinyl halogenate, vinyl pyrrolidone, and ethylene oxide, propylene oxide, butylene oxide, trimethylene oxide, tetramethylene oxide, styrene oxide, epichlorohydrin, 3,3-dichloromethyl-oxacyclobutane, 3,3-diethoxymethyl-oxacyclobutane cyclohexene oxide. which may be used either singly or in the form of copolymers.

Generally the material having such defoaming effect are preferably the organic high molecular weight materials which are observed, notwithstanding their ability of forming a homogeneous phase in the early stage of a reaction, to cause a distinct phase separation in the course of manufacture if added in an amount of more than two percent of the weight of the high molecular weight material being produced. It is advisable to use such material in an amount of less than one percent of the weight of the high molecular weight material being produced by the reaction.

Although it depends on the type of the additive, the defoaming action of such material has been found effective for practical purpose even if the addition amount is in the range of from 0.01 p.p.m. to 100,000 p.p.m. based on the high molecular weight material being produced. However, usually the addition amount is within the range of from 1 p.p.m. to 10,000 p.p.m.

In adding the above-mentioned polyvinyl or polyether compounds according to the invention to the reaction mixture in the manufacture of viscous high molecular weight materials by a reaction under heating and removing of volatile materials, it is to be noted that the compounds may be added freely at any time deemed necessary for the intended purpose, always with the effects fully ensured. Usually it is desirable to add the compounds before the foaming develops violently and thus to preclude the foaming. For example, high molecular weight polyalkylene oxide or its derivative or polyvinyl alkyl ether may be added in the manufacture of linear polyester at any time—directly into the starting reaction mixture, before or after esterification or ester-interchange reaction, during polycondensation reaction, or when the polymer melt begins to foam—but it is preferable to add the compound in the early stage of the reaction in order to take the best advantage of the addition. Depending on the addition procedure or timing, those additives may be used together with the polymerization catalyst, delusterant, coloring agent, and/or other stabilizers.

As described hereinabove, the present invention has great industrial merits in that foaming which hinders the progress of the reaction in the manufacture of viscous material giving off volatile contents in the course of manufacture can be prevented by the addition of a very small amount of a material which is capable of causing a phase separation in the reaction mixture and that the reaction time is thereby shortened and polymers of favorable properties are thus produced. Especially in the continuous manufacture of those polymers, the present invention has an important industrial significance because it permits the production of homogeneous polymers in stabilized manner for an extended period of time.

The method of the invention is illustrated by the following typical examples thereof, though it is to be construed that the present invention is not limited thereto.

EXAMPLE 1

To a modified polyester reaction mixture consisting of 776 g. of dimethyl terephthalate, 774 g. of ethylene glycol, 388 mg. of zinc acetate, 196 mg. of antimony trioxide, 0.9 g. of pentaerythritol, and 43 g. of methoxypolyethylene glycol (having a mean molecular weight of 1,420) was added polyethylene glycol having a molecular weight of about 200,000 in an amount of 40 p.p.m. of the amount of the dimethyl terephthalate. After ester-interchange reaction at 140–190° C. for 2 hours, the mixture was further heated to 280° C. thereby to remove the excess of ethylene glycol, and the resultant was further treated at a reduced pressure of 20–30 mm. Hg for 30 minutes. The initial polycondensate thus obtained was then subjected to polycondensation reaction at a reduced pressure of less than 1 mm. Hg. The maximum height of foaming during the polycondensation reaction (as measured on the basis of the liquid level immediately before the reaction) was 10.5 cm. Thus, with no major trouble due to foaming, a white polymer was given in 1.5 hours which had an intrinsic viscosity of 0.70 (as determined in a mixed solvent of phenol:tetrachloroethane=6:4 at 30° C., in terms of dl./g.).

On the other hand, when the polycondensation reaction was effected at a reduced pressure of less than 1 mm. Hg without the addition of a high molecular weight polyethylene glycol, foaming developed violently with a maximum foam height of 28 cm. Since this brought the danger of the reaction mixture being overflown out of the reaction vessel, the reaction was not practicable at a high degree of vacuum. The time required for the polycondensation reaction therefore was as long as 8 hours. The polymer obtained in this way was tinged with yellowish white and had an intrinsic viscosity of 0.54.

When the polyvinyl methyl ether as used in this example was added in an amount of 2% of the weight of the polyester produced, a clearcut phase separation was observed in the stage of the polycondensation reaction.

EXAMPLE 2

The same procedure as in Example 1 was followed except that polyethylene glycols of different molecular weights were added to effect the polycondensation reaction. The results were as shown hereunder.

| High mol. wt. polyethylene glycol (mol. wt.) | Amount added (p.p.m./ DMT) | Foam height (cm.) | Polycondensation reaction time (hr.) | Intrinsic viscosity (dl./g.) |
|---|---|---|---|---|
| About 20,000 | 3,000 | 13 | 1.5 | 0.69 |
| About 50,000 | 1,000 | 12 | 1.5 | 0.70 |
| About 100,000 | 100 | 12 | 1.5 | 0.67 |
| About 150,000 | 50 | 11 | 1.5 | 0.72 |

In every case the polycondensation reaction was effected without trouble due to foaming. When the polyethylene glycol as used in this example was added in an amount of 2% of the weight of the polyester produced, a clearcut phase separation was observed in the stage of the polycondensation reaction.

EXAMPLE 3

In the same procedure as described in Example 1, the polyethylene glycol was replaced by a copolymerized polyether having a molecular weight of 150,000 and containing tetramethylene, propylene and ethylene radicals in the molecular chain (the ratio by weight of the tetramethylene radical component:propylene radical component:ethylene radical component being 2:5:8), which was added in an amount of 2,500 p.p.m. and then the polycondensation reaction was carried out. During the reaction the foam height reached 13 cm. After 1.5 hours of the reaction, a white polymer having an intrinsic viscosity of 0.70 resulted. When the additives in this example were added in an amount of 2% of the weight of the polyester produced, a clearcut phase separation was observed in the stage of the polycondensation reaction.

EXAMPLE 4

In the same procedure as in Example 1 polyethers of many different types were added to effect the polycondensation reaction. The results are given in the following Table III.

TABLE III

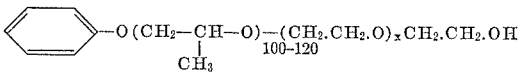

| Type of polyether | Mol. wt. of polyether (about) | Amount added (p.p.m./ DMT) | Foam height (cm.) | Polymerization time (hr.) | Intr. vis. (dl./g.) |
|---|---|---|---|---|---|
| $CH_3O(CH_2.CH_2.O)_xCH_2.CH_2.OH$ | 50,000 | 1,200 | 13 | 1.5 | 0.68 |
| $\langle\text{Ph}\rangle-O(CH_2-CH-O)_{100-120}-(CH_2.CH_2.O)_xCH_2.CH_2.OH$ with $CH_3$ branch | 13,000 | 4,000 | 12 | 1.5 | 0.70 |
| $H-O(CH_2)_8-O(CH_2)_7-O(CH_2.CH_2.O)_xCH-CH_2OH$ | 80,000 | 2,300 | 11 | 1.5 | 0.69 |
| $CH_3(CH_2)_{11}O[(CH_2)_4O]_{20-25}(CH_2.CH_2.O)_xCH_2-CH_2.OH$ | 18,000 | 3,000 | 14 | 2.0 | 0.71 |
| $C_2H_5O(CH_2.CH_2.O)_xCH_2.CH_2.OOC.CH_3$ | 11,000 | 6,000 | 15 | 2.0 | 0.74 |
| $HO.CH_2.CH_2.(O.CH_2.CH_2)_x-(O.CH.CH_2)_{100-120}-(O.CH_2.CH_2)_y.O.CH_2.CH_2.OH$ with $CH_3$ | 100,000 | 80 | 12 | 1.5 | 0.67 |
| $HO(CH_2.CH_2.O)_x-[(CH_2)_4O]_{20-25}-(CH_2.CH_2.O)_yH$ | 140,000 | 60 | 12 | 1.5 | 0.63 |

In Table III above, X and Y designate the polymerization degrees corresponding to the molecular weights. Exact degrees of polymerization were unknown, but in every case polycondensation reaction was carried out without difficulty. When the additives in this example were added in an amount of 2% of the weight of the polyester produced, a clearcut phase separation was observed in the stage of the polycondensation reaction.

EXAMPLE 5

In the same procedure as in Example 1, polyvinyl methyl ether having a molecular weight of about 30,000 was added, in lieu of polyethylene glycol, in an amount of 5 p.p.m., and ester-interchange and polycondensation reaction were effected in the same manner as in Example 1.

During the polycondensation reaction, the height of foam reached a maximum of 10.5 cm. In one hour and a half, a white polymer having an intrinsic viscosity or 0.67 was obtained. When the additives in this example were added in an amount ol 2% of the weight of the polyester produced, a clearcut fhase separation was observed in the stage of the polycondensation reaction.

EXAMPLE 6

To 664 g. of terephthalic acid was added 720 g. of ethylene glycol. The mixture was esterified at a gauge pressure of 2 kg./cm.² and a temperature of 240° C. while the water released was removed from time to time. To the reaction product, 50 g. of methoxypolyethylene glycol (with a mean molecular weight of about 2,000), 1.0 g. of pentaerythritol and 0.7 g. of zinc acetate, and further a copolymer of methyl acrylate and vinyl isobutylether at a molar ratio of 1:8 (with a molecular weight of about 18,000) in an amount of 50 p.p.m. of the amount of the terephthalic acid, were added. The mixture was heated at 200–275° C. for 3 hours, excess of ethylene glycol was removed, and the mixture was reacted at 20–30 mm. Hg for 30 minutes. The resultant product was subjected to polycondensation reaction at a reduced pressure of less than 1 mm. Hg. During the reaction, the maximum foam height attained was 12 cm. and the foaming presented no major obstacle to the reaction. In one hour and a half a white polymer having an intrinsic viscosity of 0.65 resulted.

On the other hand, a mixture of the same composition as above but which did not contain the copolymer of methyl acrylate vinyl isobutylether, when subjected to polycondensation reaction at a reduced pressure, foamed so violently with the foam top rising as high as 20 cm. above the liquid level that any reaction at a highly evacuated state was not feasible. The polycondensation reaction thus took five hours. The polymer thus obtained was yellowish white and had an intrinsic viscosity of 0.56.

The methyl acrylate vinyl isobutylether copolymer used in this example was found to cause a distinct phase separation in the stage of polycondensation reaction if it is added in an amount of 2% of the weight of the polyester being produced.

EXAMPLE 7

Polycondensation reaction was effected in the same manner as in Example 6 except that in place of the methoxypolyethylene glycol 50 g. of phenoxypolyethylene glycol having a mean molecular weight of 2,110 was used and in place of methyl acrylate vinyl isobutylester copolymer, polyethylene glycol having a molecular weight of about 500,000 was added in an amount of 5 p.p.m. of the amount of terephthalic acid.

During the polycondensation reaction the foam height attained 13 cm. at a maximum, which offered no noticeable hindrance to the reaction. After 1.5 hours of the reaction, a white polymer having an intrinsic viscosity of 0.69 resulted.

On the other hand, a mixture of the same composition as above but without the addition of the high-molecular weight polyethylene glycol was polymerized at a reduced pressure. Foaming was so violent with the foam top reaching as high as 20 cm. above the liquid level that the reaction at a high degree of vacuum was impossible and the polymerization took full six hours. The polymer thus resulted was yellowish white and had an intrinsic viscosity of 0.52. When the additives in this example were added in an amount of 2% of the weight of the polyester produced, a clearcut phase separation was observed in the stage of the polycondensation reaction.

EXAMPLE 8

To a modified polyester reaction mixture consisting of 700 g. of dimethyl terephthalate, 76 g. of dimethyl isophthalate, 744 g. of ethylene glycol, 680 mg. of zinc acetate and 50 g. of polyethylene glycol (with a mean molecular weight of 1,350) was added polypropylene glycol having a molecular weight of about 11,000 in an amount of 3,500 p.p.m. of the amount of dimethyl terephthalate. The mixture was subjected to ester-interchange reaction at 150–190° C. for 2 hours and then, with the elevation of the temperature to 280° C. and with removal of excess of ethylene glycol, the resultant product was further reacted at a reduced pressure of 20–30 mm. Hg for 30 minutes. Thereafter, the resultant product was subjected to polycondensation reaction at a reduced pressure of less than 1 mm. Hg, during which the maximum foam height attained was 14 cm. After 1.5 hours of the reaction, a white polymer having an intrinsic viscosity of 0.68 was obtained. When the additives in this example were added in an amount of 2% of the weight of the polyester produced, a clearcut phase separation was observed in the stage of the polycondensation reaction.

EXAMPLE 9

To a mixture consisting of 700 g. of dimethyl terephthalate, 68 g. of dimethyl adipate, 50 g. of p-(β-hydroxyethoxy)-methyl benzoate, 744 g. of ethylene glycol, 400 mg. of manganese acetate and 195 mg. of antimony trioxide was added polyethylene glycol having a molecular weight of about 500,000 in an amount of 3 p.p.m. of the amount of dimethyl terephthalate. After ester-interchanging reaction in the usual manner at 150–190° C. for 2 hours, the resultant was heated to 280° C., excess of ethylene glycol was removed, and the resultant product was further reacted at 20–30 mm. Hg for 30 minutes. An initial polycondensate thus obtained was further subjected to polycondensation reaction at a reduced pressure of less than 1 mm. Hg for 1.5 hours. During the polycondensation reaction the maximum foam height attained was 10.5 cm.

On the other hand, a reaction mixture of the above composition but which did not contain the high-molecular weight polyethylene glycol, when subjected to polycondensation reaction at a reduced pressure, foamed with the foam top rising 14 cm. above the liquid level. When the additives in this example were added in an amount of 2% of the weight of the polyester produced, a clearcut phase separation was observed in the stage of the polycondensation reaction.

EXAMPLE 10

500 g. of ethylene glycol was added to 330 g. of terephthalic acid, and the mixture was esterified at a gauge pressure of 2 kg./cm.$^2$ and a temperature of 240° C. with frequent removal of released water. To the reaction product, 0.4 g. of manganese formate was added, and the mixture was heated at 200–280° C. for 2 hours, excess of ethylene glycol was removed, and further butoxypolyethylene glycol having a molecular weight of about 30,000 was added in an amount of 1,000 p.p.m. of the amount of terephthalic acid, and thus the mixture was reacted at a reduced pressure of 20–30 mm. Hg and at 280° C. for 30 minutes. The reaction product obtained was subjected to polycondensation reaction at a reduced pressure of less than 1 mm. Hg. During the reaction the maximum height of foam attained was 10.0 cm., and in one hour and a half, a white polymer having an intrinsic viscosity of 0.67 was obtained. On the other hand, a mixture of the same composition as above but which did not contain butoxypolyethylene glycol, when subjected to polycondensation reaction at a reduced pressure, foamed to a maximum height of 13 cm. When the additives in this example were added in an amount of 2% of the weight of the polyester produced, a clearcut phase separation was observed in the stage of the polycondensation reaction.

EXAMPLE 11

90 mg. of manganese acetate and 45 mg. of antimony trioxide, and then 12 g. of polypropylene glycol (mean molecular weight 850) were added to a reaction mixture consisting of 254 g. of bis-(β-hydroxyethyl)-terephthalate, 20 g. of dimethyl isophthalate, and 260 g. of ethylene glycol. By the usual method the whole mixture was ester-interchanged at 140–190° C. for 2 hours. To the resultant product a polyether (molecular weight about 14,000) prepared by copolymerization of 3,3-diethoxymethyl oxacyclobutane and propylene oxide at a molar ratio of 1:3 was added in an amount of 80 p.p.m. of the acid component. The mixture was heated to 280° C., excess of ethylene glycol was removed, and a further reaction was effected at a reduced pressure of 20–30 mm. Hg for 30 minutes. An initial polycondensate thus attained was subjected to polycondensation reaction by heating at a reduced pressure of less than 1 mm. Hg. During the polycondensation reaction the maximum foam height was 11.5 cm. and the foaming gave no annoying effect on the reaction. Two hours afterwards a white polymer having an intrinsic viscosity of 0.65 resulted.

A mixture of the same composition as above but without the addition of the polyether prepared by the copolymerization of 3,3-diethoxymethyl-oxacyclobutane and propylene oxide foamed violently on polycondensation reaction at a reduced pressure. The foam top was as high as 20 cm. and the mixture could not be reacted at a high degree of vacuum. The polycondensation reaction thus took an extended period of 5 hours. The resulting polymer was yellowish white and had an intrinsic viscosity of 0.57. The copolymerized polyether of 3,3-diethoxy-oxacyclobutane and propylene oxide used herein was found to cause a distinct phase separation in the stage of polymerization, when added in an amount of 2% of the weight of the polymer being produced.

EXAMPLE 12

To 500 g. of bis-($\beta$-hydroxyethyl)-terephthalate was added methoxypolyethylene glycol having a molecular weight of about 200,000 in an amount of 10 p.p.m. of the polymer being produced, and the mixture was subjected to polycondensation reaction under a reduced pressure of 20–30 mm. Hg and at 280° C. for 30 minutes and then at a reduced pressure of less than 1 mm. Hg for 1.5 hours. The maximum foam height attained during the polycondensation was 10 cm., and the polymer thus obtained was white and had an intrinsic viscosity of 0.58. Without the addition of the high-molecular weight methoxypolyethylene glycol, a mixture of the same composition as above foamed violently in the course of the polycondensation reaction, the maximum foam height being 13 cm. When the additives in this example were added in an amount of 2% of the weight of the polyester produced, a clearcut phase separation was observed in the stage of the polycondensation reaction.

EXAMPLE 13

85 g. of polyethylene glycol (mean molecular weight 1,800) was added to a mixture of 1,460 g. of adipic acid and 1,600 g. of a 2:1 mixture (at molar ratio) of ethylene glycol and propylene glycol. The whole mixture was heated to 215° C. under pressure and the water content released was removed. To the product thus esterified, a vinyl pyrrolidone-styrene copolymer at a molar ratio of 5:3 (molecular weight about 15,000) was added in an amount of 15 p.p.m. of the weight of adipic acid, and the mixture was further heated under atmosphere pressure thereby to complete the esterification. After partial removal of ethylene glycol and propylene glycol, the resultant product was subjected to a heating at 250° C. and a reduced pressure of 10–1 mm. Hg until a desired viscosity was attained.

During the reaction at a reduced pressure the maximum foam height was 11.5 cm., and the foaming gave no seriously adverse effect on the reaction. The product was a polymer having an intrinsic viscosity of 0.45.

On the other hand, a mixture of the same composition as above but without the addition of the vinyl pyrrolidone-styrene copolymer foamed violently, the foam height reaching more than 20 cm., and a considerably long period of time was required before the desired viscosity was attained.

The vinyl pyrrolidone-styrene copolymer used in this example was found to invite a phase separation in the stage of polycondensation reaction when added in an amount of 2% of the weight of the polymer being produced.

EXAMPLE 14

In 520 parts of water kept at about 50° C., 160.6 parts of adipic acid was dissolved with stirring. Next, 116 parts of hexamethylene diamine and 28 parts of $\alpha,\omega$-diaminopolyethylene glycol (H$_2$N(CH$_2$CH$_2$O)$_n$CH$_2$CH$_2$NH$_2$) (molecular weight 280) were added in the form of an approximately 70% aqueous solution, and the pH of the 9.5% salt solution was adjusted to 7.3–7.5. This aqueous solution of nylon salt was heated to 100–160° C. under a pressure thereby to prepare a solution of a concentration in the range of 60–80%. The resulting aqueous solution was charged together with a viscosity stabilizer into a polymerization vessel. With the addition of polyethylene glycol (molecular weight about two millions) in an amount of 2 p.p.m. based on adipic acid, the mixture was heated to 200–210° C., kept at a pressure of about 17 kg./cm.$^2$, and the water released was removed. Subsequently, the reactant was heated at 250–265° C. and under a reduced pressure until a predetermined viscosity was attained. During the polycondensation reaction, there occurred no appreciable foaming, and a highly viscous polyamide was prepared without difficulty. The intrinsic viscosity of the resulting polyamide (as determined in m-cresol at 30° C.) was 0.97.

In the absence of polyethylene glycol, a mixture of the same composition as above foamed considerably in the course of polycondensation reaction under a reduced pressure and failed to be polymerized rapidly because it was overflown out of the polymerizing apparatus.

The polyethylene glycol used in this example was found to cause a distinct phase separation in the course of the polymerization, when added in an amount of 2% of the weight of the polyamide being produced.

EXAMPLE 15

Caprolactam added with 10–20% of water was charged into a polymerization column heated to 240–270° C. and was polymerized continuously. Polycaprolactam thus obtained which attained the polymerization equilibrium was then kept at a vacuum of several millimeters Hg.

While continuously removing lactam out of the system, the polycaproamide was fed to a spinneret by means of a pump thereby to carry out spinning of the product. When polyvinyl methylether (molecular weight about 100,000) was added in an amount of 0.1–5 p.p.m. of the material lactam, it was found that the foaming which is often observed in the removal of lactam in a vacuum can be inhibited and the continuous operation is facilitated.

In this example a similar defoaming effect was observed when polyethylene glycol (mean molecular weight about one million) was added, in place of the polyvinyl methylether, in an amount of 2 p.p.m.

It was further found that the polyvinyl methylether and polyethylene glycol described in this example are both capable of inducing a phase separation in the stage of polymerization, when added in an amount of 2% of the weight of the resulting polycaproamide.

EXAMPLE 16

To a mixture composed of 165 g. of bis($\gamma$-aminopropyl)ether and 75 g. of urea was added 50 p.p.m. of polyvinyl ethylether (molecular weight about 80,000), and the whole mixture was heated at 156° C. for one hour. Next, the mixture was heated at 231° C. for one hour, and lastly at 255° C. for one more hour. Then, the mixture was polymerized in a vacuum. Without any serious obstacle, a polymer having an intrinsic viscosity of 0.06 was obtained (as measured in a 0.5% concentration in m-cresol at 25° C.).

A mixture of the same composition as above but without the addition of the polyvinyl ethylene foamed so violently in the course of the polymerization with heat in a vacuum that it was sometimes necessary to lower the degree of vacuum.

The polyvinyl ethylether used herein was found to cause a distinct phase separation in the stage of polycondensation reaction, when added in an amount of 2% of the weight of the polymer being produced.

What is claimed is:
1. A method of producing viscous high molecular weight materials selected from the group consisting of polyester, polyamide, polyester amide, polycarbonate, and polyurea resins by a heating reaction which is effected while volatile materials are being removed, such process being characterized in that said reaction is effected under the coexistence of an organic material having a molecular weight of not less than 10,000 comprising a polyether material consisting essentially of homopolymers and copolymers of two or more monomers selected from ethylene oxide, propylene oxide, butylene oxide, trimethylene oxide, tetramethylene oxide, styrene oxide, epichlorohydrin, 3,3-dichloromethyloxacyclobutane and cyclohexide, in an amount of from 0.01 p.p.m. to 10,000 p.p.m. based on the viscous high molecular weight material being produced, said organic material when added in an amount of more than two percent based on the weight of the viscous high molecular weight material being produced can cause a phase separation.

2. The method of claim 1 wherein said polyether material coexists in an amount of from 1 p.p.m. to 10,000 p.p.m. based on the viscous high molecular weight being produced.

3. The method of claim 1 wherein said polyether material is polyethylene oxide.

References Cited
UNITED STATES PATENTS

| | | | |
|---|---|---|---|
| 3,274,289 | 9/1966 | Murdock | 260—857 |
| 3,287,441 | 11/1966 | Magat | 260—859 |
| 3,290,411 | 12/1966 | Tsuji | 260—873 |
| 3,329,557 | 7/1967 | Magat | 260—857 |
| 3,355,413 | 11/1967 | Kiefer | 260—860 |

FOREIGN PATENTS

| | | | |
|---|---|---|---|
| 956,833 | 4/1964 | Great Britain | 260—860 |
| 1,014,303 | 12/1965 | Great Britain | 260—860 |

PAUL LIEBERMAN, Primary Examiner

U.S. Cl. X.R.

260—858, 859R, 860, 873